Dec. 16, 1947.  J. C. AUTEN  2,432,710
TRANSMISSION CONTROL MECHANISM
Original Filed April 4, 1945
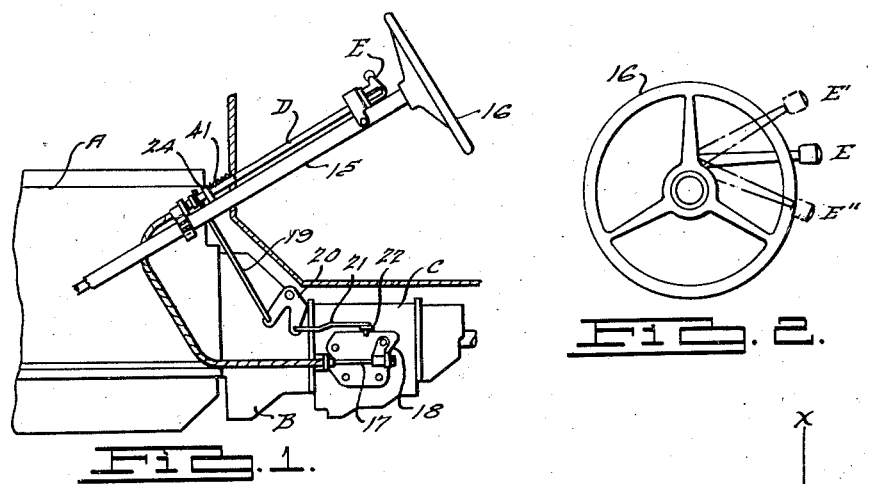
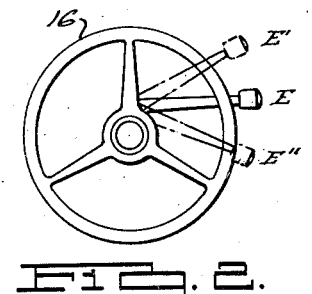
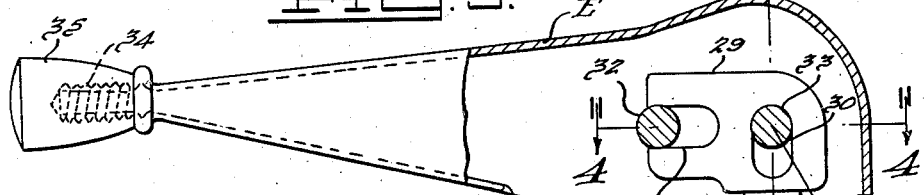
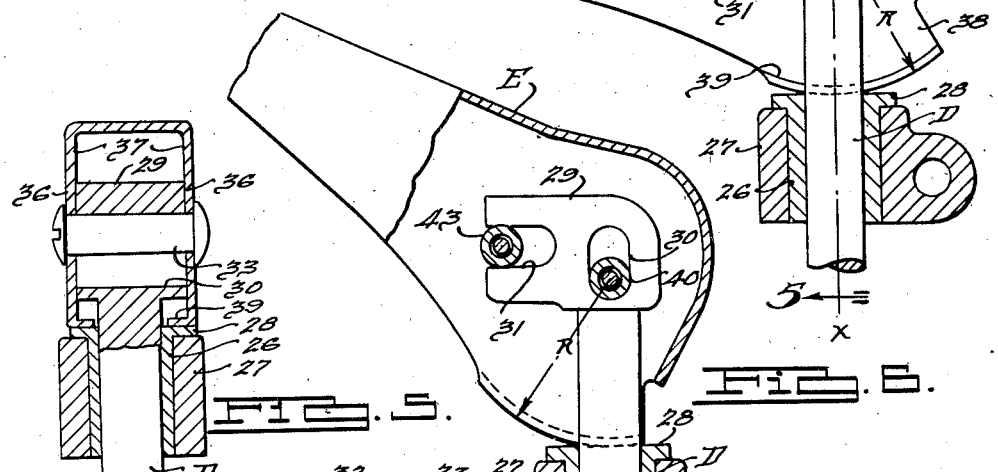
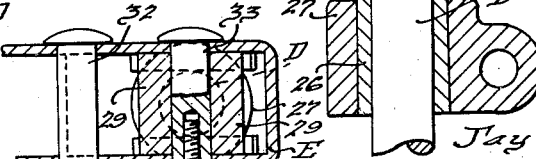
INVENTOR.
Jay C. Auten.
BY
Harness and Harris
ATTORNEYS.

Patented Dec. 16, 1947

2,432,710

UNITED STATES PATENT OFFICE 2,432,710

TRANSMISSION CONTROL MECHANISM

Jay C. Auten, Royal Oak, Mich., assignor to Chrysler Corporation, Highland Park, Mich., a corporation of Delaware Original application April 4, 1945, Serial No. 586,498. Divided and this application February 21, 1946, Serial No. 649,193

15 Claims. (Cl. 74—484)

This invention relates to transmission control mechanism and refers more particularly to improvements in transmission remote shift mechanism adapted for mounting on motor vehicle steering posts.

This application is a division of my copending application, Serial No. 586,498, filed April 4, 1945.

It is an object of my invention to provide a control which is less likely to rattle than known devices and which will give better service and have longer life, also a control mechanism having improved characteristics of thrust application from the hand lever to the main steering post mounted selector operating control rod.

Another object is to provide a control mechanism which is assembled from a minimum of component parts.

A further object is to provide a control mechanism that transmits a minimum of side thrust to the control rod.

Further objects and advantages of my invention reside in the combination and arrangement of parts hereinafter described and claimed, reference being had to the accompanying drawings in which:

Fig. 1 is a side elevational view of a typical power plant and steering wheel installation for a motor vehicle showing my invention applied thereto;

Fig. 2 is a plan view of the steering wheel and driver operable shift lever as viewed by the vehicle driver;

Fig. 3 is a sectional elevational view through the shift lever and connection to the steering post mounted control rod;

Fig. 4 is a detail sectional plan view taken as indicated by line 4—4 of Fig. 3;

Fig. 5 is a sectional elevational view taken as indicated by line 5—5 of Fig. 3; and Fig. 6 is a sectional elevational view similar to the Fig. 3 assembly but illustrating the shift lever in its upwardly swung position, a modified type of pins have been illustrated in this view.

In the drawings I have illustrated my invention in connection with a motor vehicle comprising the well known engine A, clutch B, and any type of transmission C which is adapted to be manipulated at least in part by the vehicle driver. In general, my invention provides improvements in the transmission control mechanism illustrated in the patents to F. W. Slack No. 2,291,111 of July 28, 1942 and O. E. Fishburn No. 2,284,191 of May 28, 1942 and may be employed to advantage in controlling the shift functions of various types of transmissions other than those illustrated in these patents.

My control mechanism is especially adapted for mounting on the conventional steering post 15 below the steering wheel 16, this steering post having its axis inclined forwardly and downwardly from the steering wheel. A main control rod D extends longitudinally adjacent the post 15 and is adapted to select and operate the transmission control elements for forward and reverse speed ratio drives as in the transmissions of the aforesaid patents, for example. When rod D is adjusted from a neutral position in the direction of its axis, such motion is transmitted through any suitable operating connection, such as through the Bowden wire 17, to the transmission selector lever 18. When rod D is rotated about its axis such motion is transmitted through any suitable operating connections, such as through the link and lever system 19, 20, 21, to the transmission lever 22 thereby to operate the transmission speed ratio control element which has been selected by longitudinal movement of rod D.

Rod D may be suitably guided adjacent its lower end to accommodate its rotary and longitudinal movements as in the bracket 24 mounted on post 15. Adjacent its upper end rod D is guided by a bushing 26 which is fixed in a bracket 27 which in turn is fixed to post 15. In Fig. 3 the bushing 26 has a press fit in bracket 27, this bushing having an annular flange 28 at its upper end resting on the upper face of the bracket. As will presently be apparent, the bushing 26 serves as a fixed fulcrum support for the shift lever on the post 15.

At its upper end rod D is formed with a flattened laterally elongated lever-forming head portion 29 slotted at 30 and 31. The slot 31 opens outwardly at the lever portion of head 29 and slidably receives the operating pin 32. The slot 30 is vertically elongated to slidably receive a second similar pin 33. A shift lever E comprises a hollow steel stamping terminating outwardly in a stem portion 34, threaded to receive the handle or knob 35 adapted to be grasped by the driver in manipulating lever E. If desired, the outer end of shift lever E may be formed as an integral part of the lever instead of as a separate part connected thereto. At its inner end, the walls of lever E form a housing for the rod head 29, the sides 36 of the latter slidably engaging the inner side faces 37 of lever E thereby maintaining the lever against lateral displacement relative to rod D. The pins 32 and 33 are fastened to the side walls of lever E. The housing portion of lever E opens downwardly at 38 above bushing 28 and for providing a slidable fulcrum mounting of lever E on bushing 26, lever fulcruming rockers 39 are carried by the lever. These rockers or cams are formed adjacent the lower boundary of opening 38 having shift lever supporting faces adapted to bear on the upper face of bushing flange 28. Rockers 39 are spaced from each other at opposite sides of axis X—X of rod D, the rockers extending in the general direction of the shift lever E so as to intersect a plane through axis X—X transversely to lever E.

The fulcrum point for lever E remains, during operation of the lever, substantially in a plane through axis X—X transverse to the lever. It is desirable to maintain the fulcrum point closely adjacent the rod axis X—X to minimize lateral loads on rod D and this has been accomplished in the accompanying embodiments of my invention.

The pins 32 and 33 supported between the depending side walls of lever E and cooperating with the slotted formation of the lever head 29 effect lift of the rod D in response to lift of lever handle 35 and also maintain lever E positioned against undesired displacement in the direction of its length transversely to the axis X—X, and cooperate with the flanges 39 and fulcrum bushing 26 to guide up and down shifting movements of lever E. The pin 33 and vertically elongated slot 30 serve to hold the lever E in position lengthwise thereof and at the same time allow the head 29 to be displaced upwardly within lever E when the latter is lifted to effect the selecting axial shift of rod D.

In the Fig. 3 position of the parts with the lever E in its lowermost neutral position the pin 33 engages the upper end of slot 30 and when the lever is fully swingingly raised to its Fig. 6 position then pin 33 (shown as roller 40 in Fig. 6) engages the lower end of slot 30. In lifting lever E the pin 32 moves about the axis of pin 33 and its vertical motion is transmitted to head 29. The horizontal component of its motion is absorbed in slot 31. Since only the vertical component of motion of pin 32 is transmitted to head 29 there is a minimum of side thrust rod D.

The flanges 39 are preferably of arcuate formation on a radius R about the axis of pin 33 and this axis preferably intersects axis X—X or lies closely adjacent thereto in order to cause lever E to swing vertically about the axis of rod D without undue side thrust thereon and in order to maintain a fixed distance R between the lever axis in pin 33 and the fulcrum surface 28. During upward shift of lever E from Fig. 3 to Fig. 6, the lever axis of rotation in pin 33 has an imperceptible displacement laterally of axis X—X and the lever is free to so move by slight slip at the fulcrum support 28.

Following present known arrangements in remote gearshift mechanisms in general use, rod D is preferably biased downwardly at some convenient point such as by spring 41 (Fig. 1). A more complete description of the biasing means may be found in my copending application Serial No. 586,498 filed April 4, 1945. This serves to maintain lever E in its Fig. 3 neutral downwardly swung position known as the high speed range ready to be rotated forwardly about axis X—X to the position E' in Fig. 2 for forward transmission drive setting or rearward to E'' for forward drive in high. Lever E is lifted in neutral and then moved forward about axis X—X for reverse, or rearward for forward drive in low, this latter position being omitted in some well-known shift arrangements especially where the manual shifts are supplemented by automatic shift functions in the transmission.

With lever E in its Fig. 3 neutral position, rod D is biased downward causing head 29 to engage the top portion of pin 33 thereby forcing the lever E to seat at its flanges 39 on the bushing flange 28 stationarily mounted on the post 15. Rotation of lever E either fore or aft will cause the lever and rod D to rotate as a unit about axis X—X, head 29 fitting the side walls of lever E. During this movement flanges 39 rotatably slidably bear on the bushing flange 28.

When lever E is lifted from the Fig. 3 neutral position, flanges 39 wipe across flange 28 at the bushing contact substantially in a plane transversely to the shift lever through axis X—X or closely adjacent thereto as in Fig. 3 while the pin 32 lifts the head 29 until the parts are brought to the Fig. 6 position. During this lift, the lever E rotates about the axis in pin 33 in providing a mechanical advantage for lifting rod D in the ratio of the effective lengths of lever E and the distance pin 32 is offset from pin 33. After the lever has been lifted then it is swung about axis X—X when in the Fig. 6 position. The wiping and rotating movements of flange 39 on flange 28 bring into action at different times the various portions of flanges 39 with the various portions of flange 28 so that there is no tendency to wear a groove in the fulcrum surface of flange 28.

In Fig. 6 rollers 40 and 43 have been substituted for pins 33 and 32 respectively. The rollers perform the function of the pins but provide a minimum of friction thus facilitating ease of shift of lever E. The Fig. 6 arrangement is otherwise the same as that set forth in Fig. 3, it being noted that in Fig. 6 the lever E is illustrated in its raised position.

I claim:

1. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said operating lever and said offset lever portion being operatively connected to transmit to each other motion parallel to said rod axis, one of said levers being provided with a pair of elongated slots perpendicular to and offset from each other, the other of said levers carrying a pair of members respectively engaging said slots.

2. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift liver having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rods extends, said rod lever portion having an elongated slot therethrough extending along the axis of said rod and a second slot opening laterally outwardly in said offset lever portion transversely of the first said slot, and a pair of members carried by said shift lever and extending transversely of said hollow portion in engagement with said slots respectively for providing an operable connection between said rod and shift lever.

3. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion having an elongated slot therethrough extending along the axis of said rod and a second slot opening laterally outwardly in said offset lever portions transversely of the first said slot, and a pair of rollers carried by said shift lever and extending transversely of said hollow portion in engagement with said slots respectively for providing an operable connection between said rod and shift lever.

4. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion having an elongated slot therethrough extending along the axis of said rod and a second slot extending laterally in said offset lever portion transversely of the first said slot, and a pair of rollers carried by said shift lever and extending transversely of said hollow portion in engagement with said slots respectively for providing an operable connection between said rod and shift lever.

5. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion having an elongated slot therethrough extending along the axis of said rod and a second slot opening laterally outwardly in said offset lever portion transversely of the first said slot, and a pair of pins carried by said shift lever and extending transversely of said hollow portion in engagement with said slots respectively for providing an operable connection between said rod and shift lever.

6. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion having an elongated slot therethrough extending along the axis of said rod and a second slot extending laterally in said offset lever portion transversely of the first said slot, and a pair of pins carried by said shift lever and extending transversely of said hollow portion in engagement with said slots respectively for providing an operable connection between said rod and shift lever.

7. In a steering column mounted control mechanism for selectively operating speed ratio controls of a motor vehicle transmision, a main rotatable and reciprocatory control rod having its axis parallel to said steering column and adapted for operative connection with the transmission, means for mounting said rod on said steering column comprising a member fixed relative to the steering column and having an annular fulcrum surface adjacent said rod, said rod having its upper end provided with an offset lever portion rigidly connected to said rod and extending in a direction perpendicular to said rod, a shift lever extending in a direction substantially parallel to said offset lever portion and provided with a rocker surface engaging said fulcrum surface, said offset lever portion having a first elongated slot therein extending along the axis of said rod, a first pin fastened to said shift lever and engaging said slot, said offset lever portion having a second elongated slot extending in a direction normal to said first slot, a second pin fastened to said shift lever and engaging said second slot, whereby lifting of said shift lever will move said rocker surface on said fulcrum surface and impart vertical motion to said offset lever portion through said second pin, and means connecting said shift lever and said offset lever portion to transmit the motion of rotation of said shift lever about the axis of said rod to said rod.

8. In a steering column mounted control mechanism for selectively operating speed ratio controls of a motor vehicle transmission, a main rotatable and reciprocatory control rod having its axis parallel to said steering column and adapted for operative connection with the transmission, means for mounting said rod on said steering column comprising a member fixed relative to the steering column and having an annular fulcrum surface adjacent said rod, said rod having its upper end provided with an offset lever portion rigidly connected to said rod and extending in a direction perpendicular to said rod, a shift lever extending in a direction substantially parallel to said offset lever portion and provided with a rocker surface engaging said fulcrum surface, said offset lever portion having a first elongated slot therein extending along the axis of said rod, a first roller fastened to said shift lever and engaging said slot, said offset lever portion having a second elongated slot extending in a direction normal to said first slot, a second roller fastened to said shift lever and engaging said second slot, whereby lifting of said shift lever will move said rocker surface on said fulcrum surface and impart vertical motion to said offset lever portion through said second roller, and means connecting said shift lever and said offset lever portion to transmit the motion of rotation of said shift lever about the axis of said rod to said rod.

9. In a steering column mounted control mechanism for selectively operating speed ratio controls of a motor vehicle transmission, a main rotatable and reciprocatory control rod having its axis parallel to said steering column and adapted for operative connection with the transmission, means for mounting said rod on said steering column comprising a member fixed relative to the steering column and having an annular fulcrum surface adjacent said rod, said rod having its upper end provided with an offset lever portion rigidly connected to said rod and extending in a direction perpendicular to said rod, a shift lever extending in a direction substantially parallel to said offset lever portion and provided with a rocker surface engaging said fulcrum surface, said offset lever portion having an elongated slot therein extending along the axis of said rod, a first member carried by said shift lever and engaging said slot, said offset lever portion having a substantially straight surface extending in a direction perpendicular to the axis of said rod, a second member carried by said shift lever, said second member being disposed below and engaging said straight surface whereby a lifting force on said shift lever will move said rocker surface on said fulcrum surface and impart vertical motion to said offset lever portion through the engagement of said straight surface by said second member, spring means acting on said rod to reverse said movement when the lifting force is removed from said shift lever, and means connecting said shift lever and said offset lever portion to transmit the motion of rotation of said shift lever about the axis of said rod to said rod.

10. In a steering column mounted control mechanism for selectively operating speed ratio controls of a motor vehicle transmission, a main rotatable and reciprocatory control rod having its axis parallel to said steering column and adapted for operative connection with the transmission, means for mounting said rod on said steering column comprising a member fixed relative to the steering column and having an annular fulcrum surface adjacent said rod, said rod having its upper end provided with an offset lever portion rigidly connected to said rod and extending in a direction perpendicular to said rod, a shift lever extending in a direction substantially parallel to said offset lever portion and provided with a rocker surface engaging said fulcrum surface, said offset lever portion having an elongated slot therein extending along the axis of said rod, a first pin carried by said shift lever and engaging said slot, said offset lever portion having a substantially straight surface extending in a direction perpendicular to the axis of said rod, a second pin carried by said shift lever, said second pin being disposed below and engaging said straight surface whereby a lifting force on said shift lever will move said rocker surface on said fulcrum surface and impart vertical motion to said offset lever portion through the engagement of said straight surface by said second pin, spring means acting on said rod to reverse said movement when the lifting force is removed from said shift lever, and means connecting said shift lever and said offset lever portion to transmit the motion of rotation of said shift lever about the axis of said rod to said rod.

11. In a steering column mounted control mechanism for selectively operating speed ratio controls of a motor vehicle transmission, a main rotatable and reciprocatory control rod having its axis parallel to said steering column and adapted for operative connection with the transmission, means for mounting said rod on said steering column comprising a member fixed relative to the steering column and having an annular fulcrum surface adjacent said rod, said rod having its upper end provided with an offset lever portion rigidly connected to said rod and extending in a direction perpendicular to said rod, a shift lever extending in a direction substantially parallel to said offset lever portion and provided with a rocker surface engaging said fulcrum surface, said offset lever portion having an elongated slot therein extending along the axis of said rod, a first roller carried by said shift lever and engaging said slot, said offset lever portion having a substantially straight surface extending in a direction perpendicular to the axis of said rod, a second roller carried by said shift lever, said second roller being disposed below and engaging said straight surface whereby a lifting force on said shift lever will move said rocker surface on said fulcrum surface and impart vertical motion to said offset lever portion through the engagement of said straight surface by said second roller, spring means acting on said rod to reverse said movement when the lifting force is removed from said shift lever, and means connecting said shift lever and said offset lever portion to transmit the motion of rotation of said shift lever about the axis of said rod to said rod.

12. In a steering column mounted control mechanism for selectively operating speed ratio controls of a motor vehicle transmission, a main rotatable and reciprocatory control rod having its axis extending generally longitudinally of the steering column and adapted for operative connection with the transmission, means for mounting said rod on said steering column comprising a member fixed relative to the steering column and having an annular fulcrum surface adjacent said rod, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said shift lever being provided with a rocker surface engaging said fulcrum surface, said hollow end portion of the shift lever having an opening through which said rod extends, said operating lever and said offset lever portion being operatively connected to transmit to each other motion parallel to said rod axis, one of said levers being provided with an elongated slot substantially in the axis of said rod, the other of said levers carrying a member engaging said slot, one of said levers being provided with a straight surface offset from and perpendicular to said slot, the other of said levers carrying a member disposed below and engaging said straight surface whereby a lifting force on said shift lever will move said rocker surface on said fulcrum surface and impart vertical motion to said offset lever portion, and spring means acting on said rod to reverse said movement when the lifting force is removed from said shift lever.

13. In a steering column mounted control mechanism for selectively operating speed ratio controls of a motor vehicle transmission, a main rotatable and reciprocatory control rod having its axis extending generally longitudinally of the steering column and adapted for operative connection with the transmission, means for mounting said rod on said steering column comprising a member fixed relative to the steering column and having an annular fulcrum surface adjacent said rod, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said shift lever being provided with a rocker surface engaging said fulcrum surface, said hollow end portion of the shift lever having an opening through which said rod extends, said operating lever and said offset lever portion being operatively connected to transmit to each other motion parallel to said rod axis, one of said levers being provided with an elongated slot substantially in the axis of said rod, the other of said levers carrying a pin engaging said slot, one of said levers being provided with a straight surface offset from and perpendicular to said slot, the other of said levers carrying a pin disposed below and engaging said straight surface whereby a lifting force on said shift lever will move said rocker surface on said fulcrum surface and impart vertical motion to said offset lever portion, and spring means acting on said rod to reverse said movement when the lifting force is removed from said shift lever.

14. In a steering column mounted control mechanism for selectively operating speed ratio controls of a motor vehicle transmission, a main rotatable and reciprocatory control rod having its axis extending generally longitudinally of the steering column and adapted for operative connection with the transmission, means for mounting said rod on said steering column comprising a member fixed relative to the steering column and having an annular fulcrum surface adjacent said rod, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said shift lever being provided with a rocker surface engaging said fulcrum surface, said hollow end portion of the shift lever having an opening through which said rod extends, said operating lever and said offset lever portion being operatively connected to transmit to each other motion parallel to said rod axis, one of said levers being provided with an elongated slot substantially in the axis of said rod, the other of said levers carrying a roller engaging said slot, one of said levers being provided with a straight surface offset from and perpendicular to said slot, the other of said levers carrying a roller disposed below and engaging said straight surface whereby a lifting force on said shift lever will move said rocker surface on said fulcrum surface and impart vertical motion to said offset lever portion, and spring means acting on said rod to reverse said movement when the lifting force is removed from said shift lever.

15. In a steering column mounted control mechanism for selectively operating speed ratio of a motor vehicle transmission, a main rotatable and reciprocatory control rod having its axis parallel to said steering column and adapted for operative connection with the transmission, means for mounting said rod on said steering column comprising a member fixed relative to the steering column and having an annular fulcrum surface adjacent said rod, said rod having its upper end provided with an offset lever portion rigidly connected to said rod and extending in a direction perpendicular to said rod, a shift lever extending in a direction substantially parallel to said offset lever portion and provided with a rocker surface engaging said fulcrum surface, said offset lever portion having a first elongated slot therein, a first member fastened to said shift lever and slidably engaging said first slot, said offset lever portion having a second elongated slot therein, a second member fastened to said shift lever and engaging said second slot, whereby lifting of said shift lever will move said rocker surface on said fulcrum surface and impart vertical motion to said offset lever portion through said second member, and means connecting said shift lever and said offset lever portion to transmit the motion of rotation of said shift lever about the axis of said rod to said rod.

JAY C. AUTEN.

REFERENCES CITED

The following references are of record in the file of this patent:

UNITED STATES PATENTS

| Number | Name | Date |
|---|---|---|
| 2,182,252 | Dolza et al. | Dec. 5, 1939 |
| 2,235,975 | Best | Mar. 25, 1941 |
| 2,303,787 | Burd | Dec. 1, 1942 |

Certificate of Correction

December 16, 1947.

Patent No. 2,432,710.

JAY C. AUTEN

It is hereby certified that errors appear in the printed specification of the above numbered patent requiring correction as follows: Column 3, line 47, after the word "thrust" insert *on*; column 5, line 4, for "liver" read *lever*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.*